United States Patent [19]

Pack

[11] Patent Number: 5,488,426
[45] Date of Patent: Jan. 30, 1996

[54] CLOCK-SETTING APPARATUS AND METHOD UTILIZING BROADCASTING CHARACTER RECOGNITION

[75] Inventor: Bok H. Pack, Kyunggi-do, Rep. of Korea

[73] Assignee: Goldstar Co., Ltd., Seoul, Rep. of Korea

[21] Appl. No.: 61,663

[22] Filed: May 13, 1993

[30] Foreign Application Priority Data

May 15, 1992 [KR] Rep. of Korea .................... 1992-8218

[51] Int. Cl.$^6$ ............................ H04N 5/445; H04N 5/44
[52] U.S. Cl. ..................... 348/569; 348/564; 348/567; 348/596; 348/586; 345/144
[58] Field of Search ................................... 358/147, 142, 358/146, 192.1, 188, 183, 22 PIP; 340/706, 730, 748, 750; 348/569, 570, 565–567, 563, 586, 589, 601, 553, 596, 594, 564; 345/121, 144; H04N 5/50, 5/445, 7/08, 7/087, 5/44

[56] References Cited

U.S. PATENT DOCUMENTS

| | | | |
|---|---|---|---|
| 3,911,418 | 10/1975 | Takeda | 340/730 |
| 4,004,085 | 1/1977 | Makino et al. | 358/188 |
| 4,081,797 | 3/1978 | Olson | 358/192.1 |
| 4,388,645 | 6/1983 | Cox et al. | 358/147 |
| 4,821,102 | 4/1989 | Ichikawa et al. | 358/183 |
| 5,195,134 | 3/1993 | Inoue | 358/147 |

FOREIGN PATENT DOCUMENTS

| | | | |
|---|---|---|---|
| 53-139918 | 12/1978 | Japan | 358/188 |
| 4213985 | 8/1992 | Japan | H04N 7/08 |

OTHER PUBLICATIONS

John E. Olson, "The Practical Application of On–Screen Display to a Television Receiver", IEEE Transactions on Broadcast & Television Receivers, Aug. 1973, vol. BTR–19 No. 3, pp. 169–175.

Primary Examiner—James J. Groody
Assistant Examiner—Safet Metjahic

[57] ABSTRACT

An automatic clock-setting apparatus and method, which can recognize clock-displaying characters as numerals included in a television broadcasting signal when the clock-displaying characters are displayed on a screen, and which can automatically set a current time of a built-in timer of a television or a video cassette recorder by the recognized numerals. According to the invention, it is possible to set a clock exactly and to make the clock-setting operation by the user convenient.

3 Claims, 5 Drawing Sheets

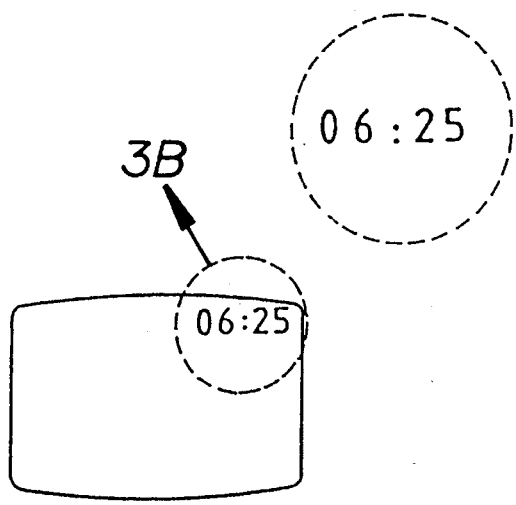
FIG. 3B
FIG. 3A
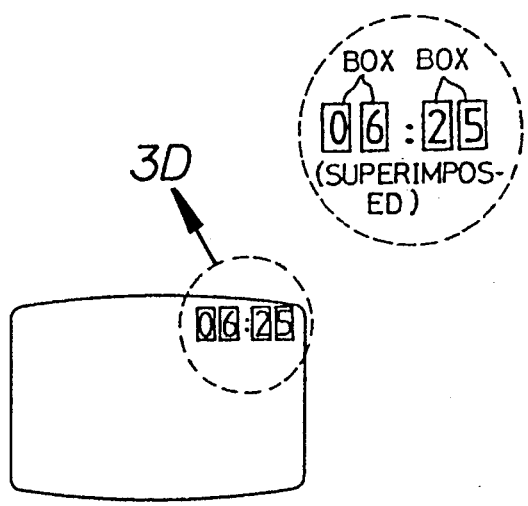
FIG. 3D
FIG. 3C
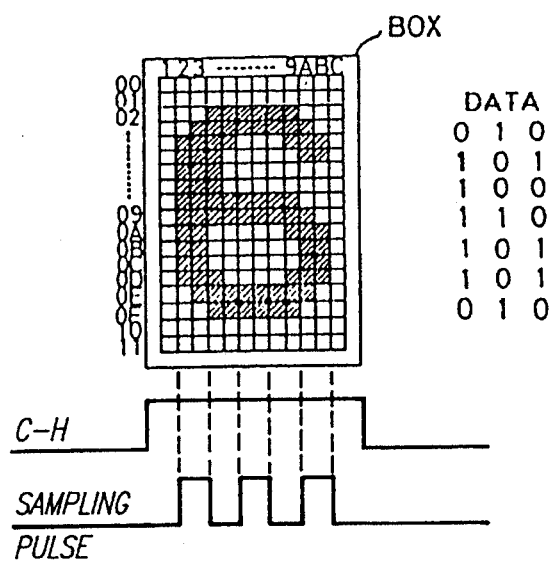
FIG. 4

FIG. 5A
HOR. SYNC. SIGNAL
FIG. 5B
CRR SIGNAL
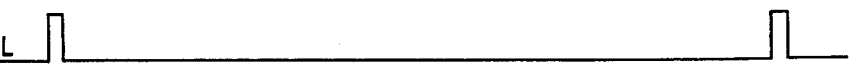
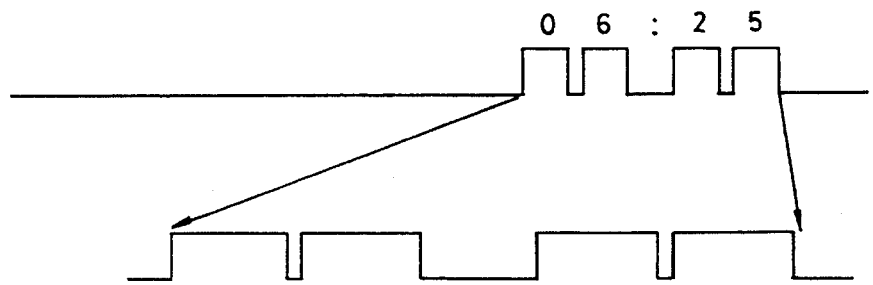
FIG. 5C
WHITE (CHARACTER) LEVEL
BLACK (CRR) LEVEL
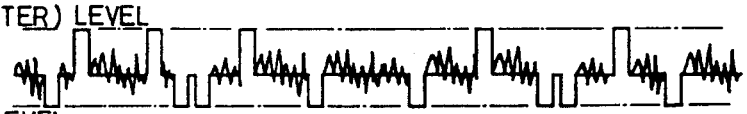
FIG. 5D
OUTPUT OF CHARACTER
SIGNAL DETECTOR

FIG. 6

CLOCK-SETTING APPARATUS AND METHOD UTILIZING BROADCASTING CHARACTER RECOGNITION

BACKGROUND OF THE INVENTION

1. Field of the Invention

The present invention relates to a clock-setting apparatus and method, and more particularly to a clock-setting apparatus and method which can set a current time by recognizing clock-displaying characters as numerals included in a television broadcasting signal.

2. Description of the Prior Art.

An electric appliance having a reservation function such as a television, a video cassette recorder, etc., automatically turns on/off the power supply thereto or performs the reserved recording of a television program at a reserved time. In order to control the operation of the appliance exactly according to the reserved time, a timer built in such appliance should be set precisely by the current time.

Conventionally, clock-setting of an appliance is performed by utilizing the 'on-screen' display function of a television. That is, if a user selects the clock-setting key of a remote controller, a clock-setting menu is displayed on the screen. Thereafter, he can enter a clock-modulating key of the remote controller, seeing another clock, in order to correct the current hour, minute, and second displayed on the screen, thereby setting the timer. Accordingly, it is necessary to secure another clock and to correct the current time by remote control key one by one, seeing the clock in this method. Therefore, it is inconvenient to use and errors may occur in setting the timer.

Meanwhile, in Korean Patent Application No. 90-8042, discloses an apparatus for automatically setting a timer with the unit of second by utilizing a time signal sound transmitted from a broadcasting station. The above apparatus detects a time signal sound transmitted from a broadcasting station and at the moment when the time signal sound is detected, the apparatus compares the value counted by a counter with the unit of second with a reference value (that is, 30 seconds). At this time, if the counted value is larger than the reference value, a counted value of a counter with the unit of minute is increased by 1 and a counted value of a counter with the unit of second is reset. And, if not, only the counted value of the counter with the unit of second is reset.

However, the apparatus for automatically setting a timer with the unit of second utilizes, not clock-displaying character information, but a time signal sound from a broadcasting station, and thus its subject matter is different from that of the present apparatus. Moreover, according to the above apparatus, a clock with the unit of second can be set automatically but a clock with the unit of hour cannot be set.

SUMMARY OF THE INVENTION

It is an object of the present invention to provide a clock-setting apparatus and method utilizing broadcasting character recognition which can set a clock exactly and enable the clock-setting operation to be convenient by recognizing numerals of a clock-displaying character and setting current time of a built-in timer by the recognized numerals when the characters included in a television broadcasting signal is displayed on the screen.

It order to achieve the above object, there is provided a clock-setting apparatus which comprises:

means for generating a character recognition region signal determining a character recognition region to recognize a clock-displaying character signal determining clock-displaying characters in an inputted video signal, and displaying the character recognition region as superimposed on the clock-displaying characters shown on a screen;

means for detecting a synchronous signal in the inputted video signal and providing the synchronous signal as a reference signal of character recognition;

means for detecting clock-displaying character signal by separating the character signal from a background video signal in the character recognition region;

means for memorizing the character signal detected by the character signal detecting means;

means for controlling position movement of the character recognition region displayed as superimposed on the clock-displaying character by the character recognition region signal generating means and performing clock-setting of a timer according to the character signal provided by the memorizing means; and means for providing a clock-setting control signal and a position movement control signal of the character recognition region to the controlling means.

Moreover, in order to achieve the above object, there is provided a clock-setting method which comprises the steps of:

a) detecting if a synchronous signal separated from an inputted video signal is entered and then a clock-setting control signal is entered;

b) detecting if a position movement control signal of a character recognition region is entered within a preset time in order to display the character recognition region as superimposed on the position of clock-displaying characters on a television screen when the clock-setting control signal is entered, and then moving the position of the character recognition region according to the inputted position movement control signal;

c) obtaining a character signal information in the character recognition region by sampling when the character recognition region is superimposed on the clock-displaying character position;

d) recognizing a clock-displaying numeral corresponding to the sampled character signal information by comparing the sampled character signal information with numerical data on a data base; and e) setting a timer by a clock of the recognized numeral.

BRIEF DESCRIPTION OF THE DRAWINGS

The above object and other advantages of the present invention will become more apparent by describing the preferred embodiment thereof with reference to the accompanying drawings, in which:

FIG. 3A is an illustrative view of a screen on which clock-displaying characters are displayed.

FIG. 3B is a close-up view of the time display of FIG. 3A.

FIG. 3C is an illustrative view of a screen in clock-setting according to the present invention.

FIG. 3D is a close-up view of the recognition region of the screen of FIG. 3C.

FIG. 4 shows a data structure and a sampling timing view for explaining clock-displaying character recognition according to the present invention.

FIGS. 5A to 5D are operational timing views of the present apparatus.

FIG. 6 shows illustrative views of data structure for explaining clock-displaying character recognition according to the present invention.

DETAILED DESCRIPTION OF THE PREFERRED EMBODIMENT

Figure 1:
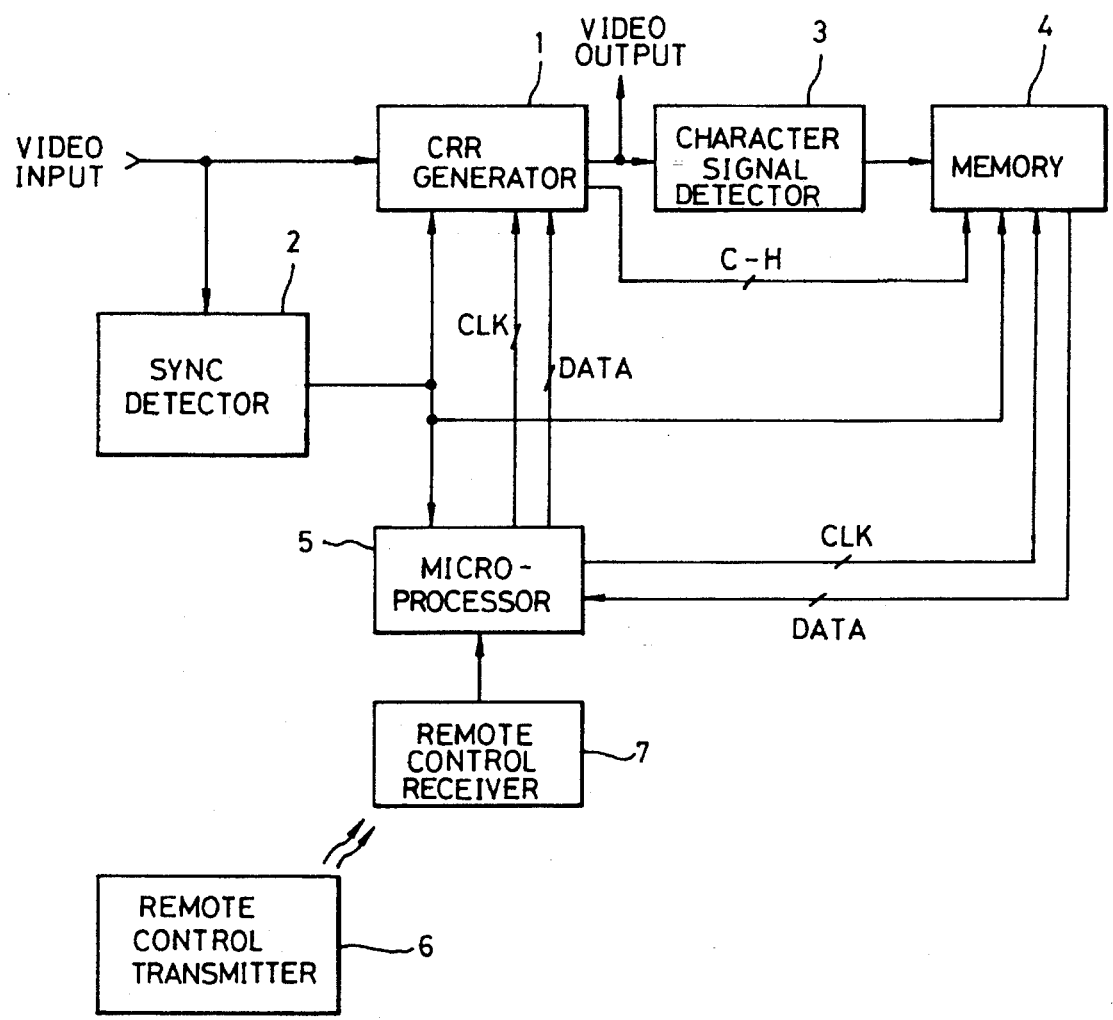
FIG. 1 is a schematic block diagram of a clock-setting apparatus according to the present invention.

Referring to FIG. 1, a clock-setting apparatus according to the present invention comprises a character recognition region generator 1 for superimposing a character recognition region, where clock-displaying character information in an inputted video signal is recognized, on the clock-displaying character on a screen, a synchronous signal detector 2 for separating and detecting a synchronous signal from the inputted video signal, a character signal detector 3 for detecting a white level signal that is a clock-displaying character signal in the output of the character recognition region generator 1, and a memory 4 for temporarily storing character signal information provided from the character signal detector 3. The present apparatus also includes a microprocessor 5 for controlling the operation of the apparatus, and a remote control transmitter 6 and receiver 7 for providing a clock-setting control key signal and a position movement control key signal to the microprocessor 5.

The operations and features of the clock-setting apparatus and method according to the present invention will be described in detail with reference to FIGS. 1 to 6.

First, FIGS. 3A and 3B show shows an example of a clock-displaying character on the television screen. Generally, the current time provided from a broadcasting station is displayed in numerals at the upper end of the right side on the screen. For example, the time of six twenty-five is shown as the characters "06:25".

The above clock-displaying characters are displayed by a white level with respect to the background screen. Therefore, according to the present invention, the box-shaped character recognition region surrounding the outer block of the clock-displaying characters is displayed on the screen as shown in FIG. 3C. The position of the character recognition region may be moved by the remote control key operation so that the region exactly surrounds the outer block of the clock-displaying character. At this time, the character as shown in FIG. 3D recognition region is displayed by a black level, thereby being distinguished from the clock-displaying characters.

Figure 2:
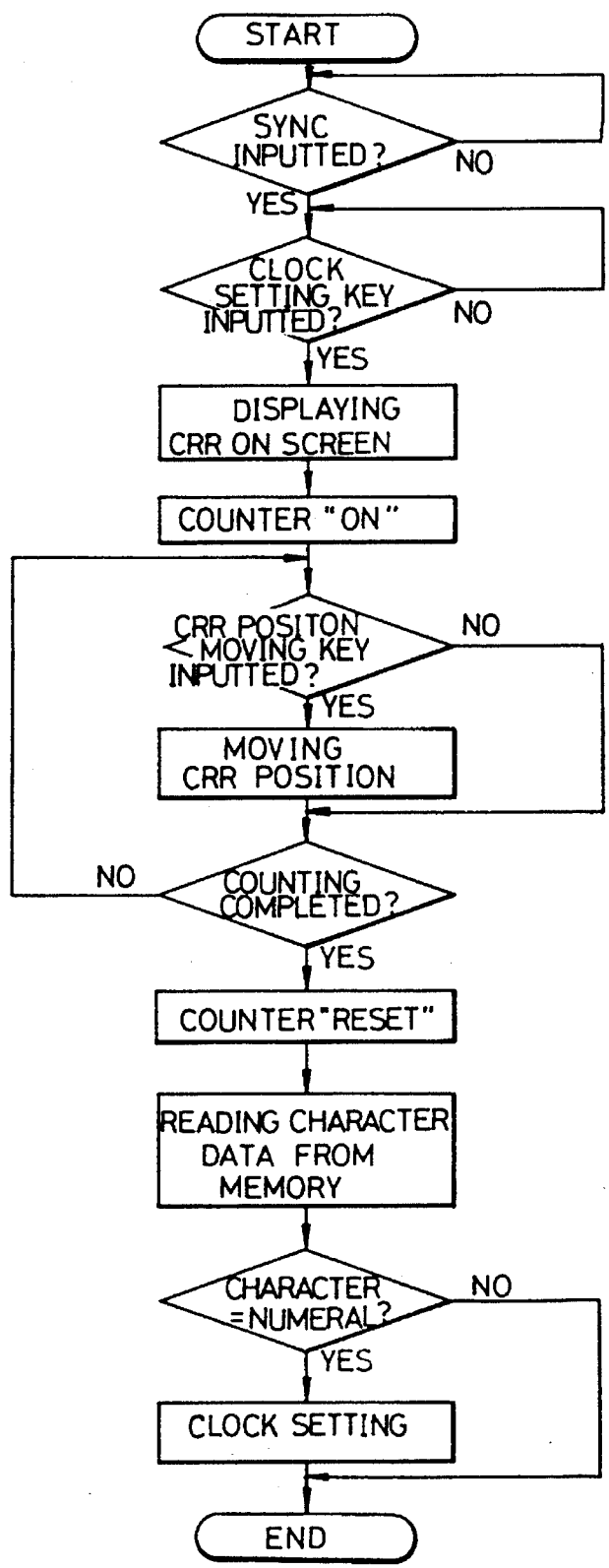
FIG. 2 shows an algorithm in which the clock-setting method according to the present invention is applied.

That is, with reference to FIGS. 1 and 2, when a predetermined clock-setting key is entered on remote control transmitter 6 by a user, microprocessor 5 recognizes it through remote control receiver 7 and provides a clock signal CLK and a control data DATA showing the outline of the .character recognition region by character recognition region generator 1. Therefore, character recognition region generator 1 displays a character recognition region at predetermined position on the screen, for example, at the position of the upper end of the right side in the embodiment, on the basis of a horizontal synchronous signal like that of FIG. 5A. The horizontal synchronous signal is separated from the video signal by synchronous detector 2 and then is provided to microprocessor 5 and memory 4 in order to be utilized as a reference signal of recognizing the character to be displayed or sampled thereafter.

There may be cases where the displaying position of the character recognition region provided from recognition region generator 1 does not accord with the clock-displaying characters of a broadcasting station. In this case, a predetermined position movement key of remote control transmitter 6 is operated by a user so that microprocessor 5 receives the key signal and moves the position of character recognition region by the prescribed distance unit on the screen on the basis of the horizontal synchronous signal. At this time, microprocessor 5 performs the position movement control only if the position movement of the character recognition region is completed within the preset time by the built-in counter, thereby preventing unnecessary control operation.

After the position of character recognition region surrounds the outline of the clock-displaying characters (for example, 06:25) exactly within the preset time of the counter, character signal detector 3 separates and detects the character signal. That is, the character signal is detected by utilizing the level difference between the background video signal and a character signal (white level) and provides the separated character signal to memory 4 as character recognition information. Memory 4 stores the character signal information provided from character signal detector 3 as sampling information with a predetermined sampling number which is sufficient to recognize the character.

That is, recognition region generator 1, as shown in FIG. 5B, provides a character recognition region signal C–H representing the character recognition region to memory 4 as a memory reference signal. Accordingly, memory 4 stores only the information, which is provided while the character recognition region signal C–H is entered, among the character signal information provided from character signal detector 3 as character signal information for clock-setting.

Therefore, while the clock-displaying characters (for example, 06:25) are entered, the video signal is composed of a clock-displaying character signal of a white level, an original video signal and a character recognition region signal of a black level, as shown in FIG. 5C. The video signal passes through character signal detector 3 as stated above, so that only character signal is separated for detection and then is stored in memory 4 as character signal information.

FIG. 4 shows a data structure of character signal information obtained by sampling and a timing view of character recognition region signal C–H for a numeral "6" of the clock-displaying characters (06:25). Where, the numeral recognition information (that is, the information which is sufficient to recognize "6") has a data structure sampled horizontally at 2nd and 3rd columns, 6th and 7th columns, and A and B columns and vertically at 2nd and 3rd lines, 4th and 5th lines, . . . , OE and OF lines.

Figure 6:
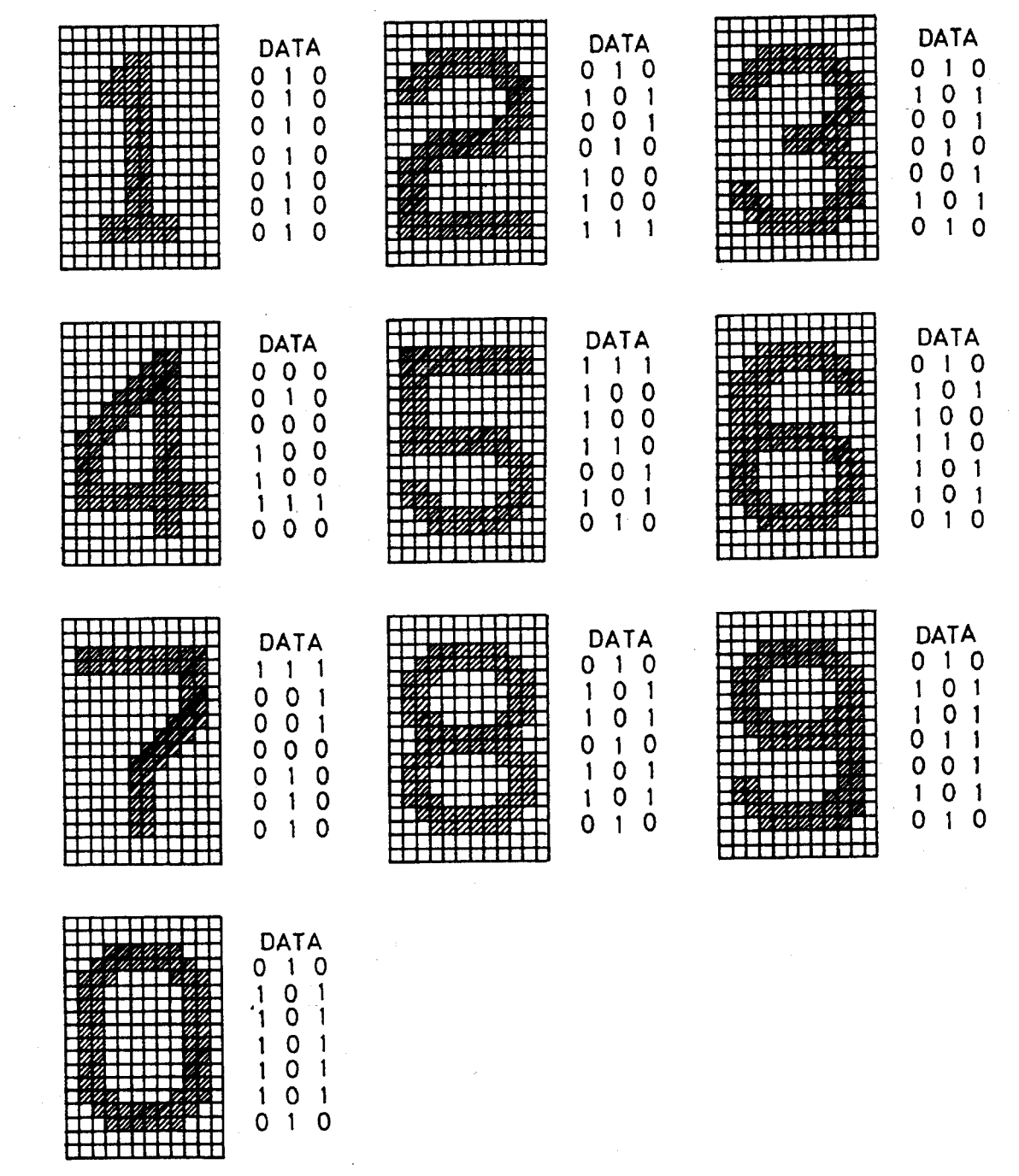

FIG. 6 shows examples of character recognition data base with respect to each of Arabic numerals, 1,2,3,4,5,6,7,8,9 and 0 for displaying the current time. Microprocessor 5 compares the data with character signal information (the information detected by character signal detector and stored in memory) in the character recognition region, thereby detecting which Arabic numeral corresponds to the character signal information.

Therefore, microprocessor 5 recognizes the clock-displaying characters (06:25) in the character recognition region as the time of six twenty-five and sets the built-in timer by the recognized time, thereby completing the clock-setting operation through character recognition according to the present invention.

From the foregoing, it will be apparent that the present apparatus can recognize a clock displayed on the screen as character information provided from a broadcasting station through a simple remote control key operation and set a timer automatically by the recognized time. Thus, it is convenient to use and always possible to set a clock exactly.

While the present invention has been described and illustrated herein with reference to the preferred embodiment thereof, it will be understood by those skilled in the art that various changes in form and details may be made therein without departing from the spirit and scope of the invention.

What is claimed is:

1. A clock-setting apparatus comprising:

means for generating a character recognition region signal determining a character recognition region to recognize a clock-displaying character signal determining clock-displaying characters in an inputted video signal, and displaying said character recognition region as superimposed on clock-displaying characters shown on a screen;

means for detecting a synchronous signal in said inputted video signal and providing said synchronous signal as a reference signal of character recognition;

means for detecting said character signal by separating said character signal from a background video signal in said character recognition region;

means for memorizing said character signal detected by character signal detecting means;

means for controlling position movement of said character recognition region displayed as superimposed on said characters by said character recognition region signal generating means, and performing clock-setting of a timer according to said character signal provided by said memorizing means; and means for providing a clock-setting control signal and a position movement control signal of said character recognition region to said controlling means.

2. A clock-setting apparatus as claimed in claim 1, wherein said character signal provided from said memorizing means is a sampled information which is sufficient to recognize the corresponding characters in said character recognition region, and said controlling means compares said characters with each of numeral recognition information having a sampled data structure for determining each of Arabic numerals, whereby said controlling means recognizes numerals corresponding to said characters.

3. A clock-setting method comprising the steps of:

a) detecting if a synchronous signal separated from an inputted video signal is entered and then a clock-setting control signal is entered;

b) detecting if a position movement control signal of a character recognition region is entered within a preset time in order to display the character recognition region as superimposed on the position of clock-displaying characters on a television screen when the clock-setting control signal is entered, and then moving the position of the character recognition region according to the inputted position movement control signal;

c) obtaining a character signal information in the character recognition region by sampling when the character recognition region is superimposed on the clock-displaying character position;

d) recognizing a clock-displaying numeral corresponding to the sampled character signal information by comparing the sampled character signal information with numerical data on a data base; and e) setting a timer by a clock of the recognized numeral.

* * * * *